US009164664B2

(12) United States Patent
Nicol, II et al.

(10) Patent No.: US 9,164,664 B2
(45) Date of Patent: Oct. 20, 2015

(54) SYSTEM AND METHOD FOR AVATAR CLONING

(71) Applicant: INTERNATIONAL BUSINESS MACHINES CORPORATION, Armonk, NY (US)

(72) Inventors: William Bruce Nicol, II, Durham, NC (US); Brian Ronald Bokor, Raleigh, NC (US); Peter Frederick Haggar, Raleigh, NC (US); Daniel Edward House, Raleigh, NC (US); Andrew Bryan Smith, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 13/946,536

(22) Filed: Jul. 19, 2013

(65) Prior Publication Data
US 2013/0305185 A1    Nov. 14, 2013

Related U.S. Application Data

(63) Continuation of application No. 12/024,164, filed on Feb. 1, 2008, now Pat. No. 8,584,024.

(51) Int. Cl.
  *G06F 3/048* (2013.01)
  *G06F 3/0484* (2013.01)
  *G06F 3/0481* (2013.01)
  *G06Q 10/10* (2012.01)

(52) U.S. Cl.
  CPC ............ *G06F 3/0484* (2013.01); *G06F 3/0481* (2013.01); *G06Q 10/10* (2013.01)

(58) Field of Classification Search
  CPC ...................................................... G06F 3/048
  USPC ................................................................ 715/779
  See application file for complete search history.

(56) References Cited

U.S. PATENT DOCUMENTS

| | | | |
|---|---|---|---|
| 6,476,830 B1 | 11/2002 | Farmer | |
| 7,467,998 B2 | 12/2008 | Yamada | |
| 7,484,176 B2 | 1/2009 | Blattner | |
| 7,502,825 B2 | 3/2009 | Webb | |
| 7,559,834 B1 | 7/2009 | York | |
| 7,594,847 B1 | 9/2009 | York | |
| 7,636,755 B2 | 12/2009 | Blattner | |
| 7,675,519 B2 | 3/2010 | Tobias | |
| 7,720,733 B2 | 5/2010 | Jung | |
| 7,769,806 B2 | 8/2010 | Wie | |
| 7,775,885 B2 | 8/2010 | Van Luchene | |
| 7,789,741 B1 | 9/2010 | Fields | |
| 7,810,047 B2 | 10/2010 | Lee | |
| 7,814,041 B2 | 10/2010 | Caporale | |
| 7,990,387 B2 | 8/2011 | Hamilton, II | |
| 8,296,246 B2 * | 10/2012 | Hamilton et al. | 705/346 |
| 8,584,024 B2 * | 11/2013 | Nicol et al. | 715/757 |

(Continued)

OTHER PUBLICATIONS

Roush, Wade, Your Virutal Clone, Chatterbots from MyCyberTwin Can Respond to Questions About You When You're Not Online, Technology Review, Apr. 20, 2007, pp. 1-4.

*Primary Examiner* — William Titcomb
(74) *Attorney, Agent, or Firm* — Moore & Van Allen PLLC (57) ABSTRACT

Avatar cloning in a virtual world may include receiving an input indicating that a user desires to access a cloning feature and allowing a cloned avatar to be cloned from the user's avatar.

20 Claims, 4 Drawing Sheets

(56) References Cited

U.S. PATENT DOCUMENTS

| | | |
|---|---|---|
| 2003/0050831 A1 | 3/2003 | Klayh |
| 2004/0221224 A1 | 11/2004 | Blattner |
| 2006/0028475 A1 | 2/2006 | Tobias |
| 2007/0112574 A1 | 5/2007 | Greene |
| 2007/0270226 A1 | 11/2007 | York |
| 2008/0214273 A1 | 9/2008 | Snoddy |
| 2008/0215981 A1 | 9/2008 | York |
| 2008/0242423 A1 | 10/2008 | Kerr |
| 2008/0303811 A1 | 12/2008 | Van Luchene |
| 2009/0119604 A1 | 5/2009 | Simard |
| 2009/0216691 A1 | 8/2009 | Borzestowski |
| 2009/0251471 A1* | 10/2009 | Bokor et al. .................. 345/474 |
| 2009/0254868 A1* | 10/2009 | Bokor et al. .................. 715/863 |
| 2010/0227682 A1 | 9/2010 | Reville |
| 2010/0267448 A1 | 10/2010 | Snoddy |
| 2010/0311483 A1 | 12/2010 | Fields |

* cited by examiner

FIG. 3

SYSTEM AND METHOD FOR AVATAR CLONING

CROSS-REFERENCE TO RELATED APPLICATION

This application is a continuation of U.S. patent application Ser. No. 12/024,164 entitled "AVATAR CLONING IN A VIRTUAL WORLD" filed Feb. 1, 2008, the content of which is incorporated herein by reference in its entirety.

BACKGROUND OF THE INVENTION

The present invention relates to simulations, virtual world simulations of the real-world or real-life or a virtual world and the like, and more particularly to a system and method for avatar cloning in a virtual world.

Computer based simulations are becoming more ubiquitous. Simulations may be used for training purposes, for entertainment or for other purposes. Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Currently, an avatar in a virtual world controlled by a user may be in only one location at a time. If a user wanted his avatar to be in more than one location in the virtual world at a specific time, the user would have to choose only one of the locations, possibly missing out on one or more opportunities. Currently known virtual world systems limit a user to having only a single avatar within an account running on a computer system. Accordingly, the user would be required to set up multiple accounts each running on a separate system in order to develop and control multiple avatars within the virtual world. Additionally, this approach can have significant drawbacks. For example, maintaining all of the characteristics, identity and profiles across multiple avatars may be an overwhelming challenge. Also, maintaining the different virtual world actions of each avatar may be difficult and cumbersome, especially if they are on different computer systems.

BRIEF SUMMARY OF THE INVENTION

In accordance with aspects of the present invention, a system for avatar cloning in a virtual world may include a module operable on the processor for receiving an input indicating a user desires to access a cloning feature to clone an avatar of the user.

In some aspects, the system includes a module operable on the processor for presenting a graphical user interface that comprises an option for the user to predefine actions for a cloned avatar of the avatar of the user to perform in the virtual world, the predefined actions for the cloned avatar of the avatar of the user to perform being different from and occurring simultaneously with the current activity of the avatar, wherein the predefined action for the cloned avatar of the avatar of the user to perform and the current activity of the avatar occur at separate locations in the virtual world. In some aspects, the system includes a module operable on the processor for allowing the cloned avatar of the user to be cloned from the avatar of the user.

In some aspects, the system includes a module operable on the processor for presenting a split screen comprising at least two portions that are split from each other to permit the user to control either the avatar of the user on a first portion of the split screen or the clone of the avatar of the user on a second portion of the split screen.

In some aspects, the system includes a module operable on the processor for identifying between the cloned avatar of the user in the second portion and the avatar of the user in the first portion which one is currently being actively controlled by the user, wherein the cloned avatar of the user and the avatar of the user are located in different portions of the virtual world.

In some aspects, the split screen comprises a first tool bar that is shared by the at least two portions and a second tool bar that is smaller than the first tool bar and positioned and used only in the second portion of the split screen, wherein the second tool bar comprises an indicator of the current actions of the cloned avatar and is configured to allow the user to directly control the actions of the cloned avatar.

In accordance with aspects of the present invention, a computer program product for avatar cloning in a virtual world is provided. In some aspects, the computer program product includes a computer readable storage medium having computer readable program code embodied therewith, the computer readable computer program code comprising computer readable program code configured to receive a request to clone an original avatar of a user. In some aspects, the computer program product further includes computer readable program code configured to present a graphical user interface to allow the user to clone the original avatar of the user.

In some aspects, the computer program product further includes computer readable program code configured to allow control of the clone of the original avatar of the user, wherein the clone is controllable by at least one of: computer readable program code configured to associate a predefined functionality with the clone for the clone to perform automatically while the user controls the original avatar, the predefined functionality for the clone to perform being different from and occurring simultaneously with the current activity of the original avatar, wherein the predefined functionality for the clone to perform and the current activity of the original avatar occur at separate locations in the virtual world; computer readable program code configured to present a split screen comprising a first portion and a second portion that is split from the first portion to permit the user to control either the original avatar of the user on the first portion of the split screen or the clone of the original avatar of the user on the second portion of the split screen; and computer readable program code configured to identify on the split screen which avatar is currently being actively controlled by the user.

In some aspects of the computer program product, the split screen comprises a first tool bar that is shared by the at least two portions and a second tool bar that is smaller than the first tool bar and positioned and used only in the second portion of the split screen, wherein the second tool bar comprises an indicator of the current actions of the cloned avatar and is configured to allow the user to directly control the actions of the cloned avatar.

Other aspects and features of the present invention, as defined solely by the claims, will become apparent to those ordinarily skilled in the art upon review of the following

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
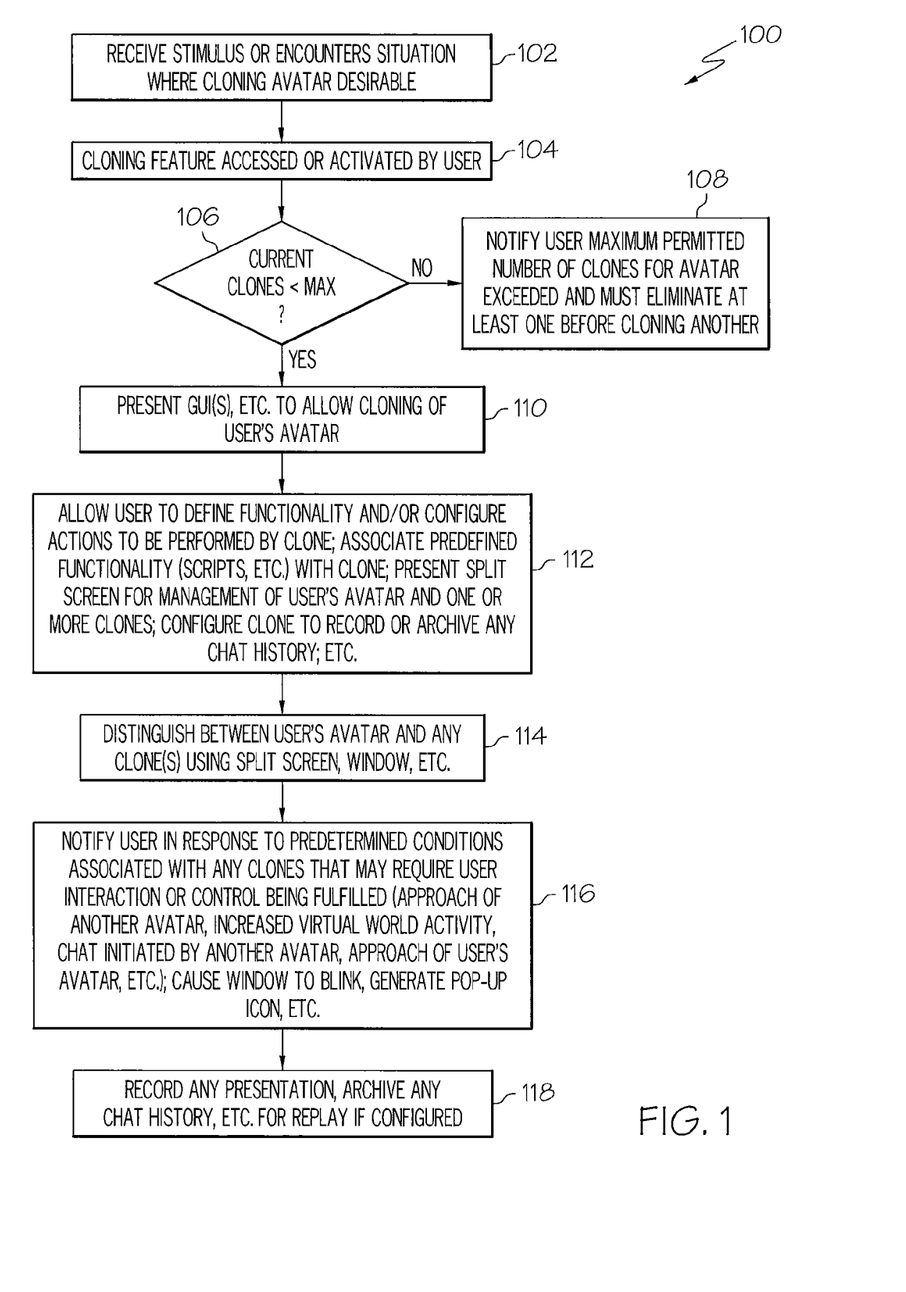
FIG. 1 is a flow chart of an example of a method for avatar cloning in a virtual world in accordance with an embodiment of the present invention.

FIG. 1 is a flow chart of an example of a method 100 for avatar cloning in a virtual world in accordance with an embodiment of the present invention. In block 102, a user's avatar may encounter a situation where cloning of the user's original avatar is desirable. For example, a user may desire to clone his original avatar in any situation where the user desires his avatar to perform two or more tasks simultaneously. For example, if a user's avatar is in a virtual world class room listening to a lecture and receives a phone call from a virtual world client or business associate who want to meet at another location in the virtual world, the user may desire a clone his original avatar. The cloned or copies avatar could stay behind in the class room and record the lecture while the user's original or primary avatar meets the client or business associate, similar to that illustrated in FIG. 2A. Once the meeting is finished, the user in association with his original or primary avatar may return to the class room. The cloned avatar may no longer be needed and the cloning process may be reversed or the cloned avatar deleted.

If cloning the user's avatar is desirable, the user or any other entity may access or activate the cloning feature of the virtual world, as shown in block 104. The user may access or activate the cloning feature by any activation or input means, such as pressing one or more keyboard keys, clicking a mouse or other computer pointing device, selecting an option on an onscreen menu or the like. By accessing or activating the cloning feature, a request for a clone may be sent. By receiving the request or another indication to create a clone, the cloning feature of the virtual world system may allow the user's avatar to be cloned.

In block 106, a determination may be made whether the current number of clones of the user's avatar is less than a preset maximum permitted number of clones of the user's avatar. The virtual world operator or owner may preset the maximum number of clones permitted for each user's avatar. As an example, a user may pay a higher subscription or participation fee for the virtual world in order to have the cloning feature available as an option. The fee may also be higher based on the number of clones the user is permitted to have at any one time. In another embodiment of the present invention, the user may be billed based on whether any cloned avatars were created during a predetermined time period, such as month, the duration each cloned avatar existed, and the number of cloned avatars at any one time.

If the current number of clones of the user's avatar in block 106 is less the maximum permitted number, the method 100 may advance to block 110. One or more clones of the user's avatar may be created anytime after a determination is made that the number of clones is less than the maximum permitted number of clones. Otherwise, the method may advance to block 108.

In block 108, the request to clone the user's avatar may be denied and the user may be notified of the denial. The user may also be notified that creating another clone of the user's avatar would exceed the maximum permitted number of clones of the user's avatar and that in order to create another clone of the user's avatar, at least one of the existing clones must be eliminated or deactivated. Each notification may be presented audibly, visibly and/or by any means capable of being perceived by the user. The cloning feature may be exited or deactivated at any time.

As previously mentioned, if the current number of clones of the user's avatar is less the maximum permitted number, the method 100 may advance to block 110. In block 110, a graphical user interface (GUI) may be presented to the user to allow access to the cloning feature. One or more GUIs may be presented for user input regarding various aspects of avatar cloning, such as various functionalities of the clone, actions for the clone to take, how many clones may be created, where to place the clone, when to create the clone, notifications to the user, how the clones will be displayed to the user, and the like. The GUIs may be presented to the user in separate GUIs or may be combined and presented to the user in one GUI.

In block 112, the user may be allowed to define various functionalities and configure actions to be performed by the cloned avatar. In one embodiment, the user may be allowed to associate one or more predefined functionalities with the clone, such as predefined autonomous actions, automatically performed actions, and the like. The predefined functionalities may be automatically performed in response to one or more stimuli occurring. For example, the user may specify that the clone automatically say "hello" in response to another avatar coming within a predetermined proximate range of the clone. The predefined functionalities may be embodied in various computer code, including scripts, applications, programs and the like.

In accordance with another aspect of the present invention, the virtual world operator or owner may predefine actions permitted to be performed by any cloned avatars. A user may select from a menu or other means what actions a cloned avatar may be permitted to perform. In a further aspect of the invention, a user may be able to define actions to be performed by his cloned avatar as well as selecting actions defined by the virtual world operator or owner or may be able to modify cloned avatar actions predefined by the virtual world operator or owner.

Also, in block 112, the clone may also be configured to perform predefined autonomous actions in the virtual world. No user input would be required for the clone to perform such predefined actions. For example, a user may specify that the clone record any chat histories or any other interactions with other avatars, record any lectures or any other observations or activities associated with the cloned avatar.

Block 112 may also permit the user to define one or more split screens. A split screen may be employed to display one or more cloned avatars and/or the user's original or primary avatar in their respective portions of the virtual world on a single display device. This may allow ease of management of the user's avatar and/or one or more cloned avatars. The user may specify how many split screens, if any, to employ.

Figure 2A:
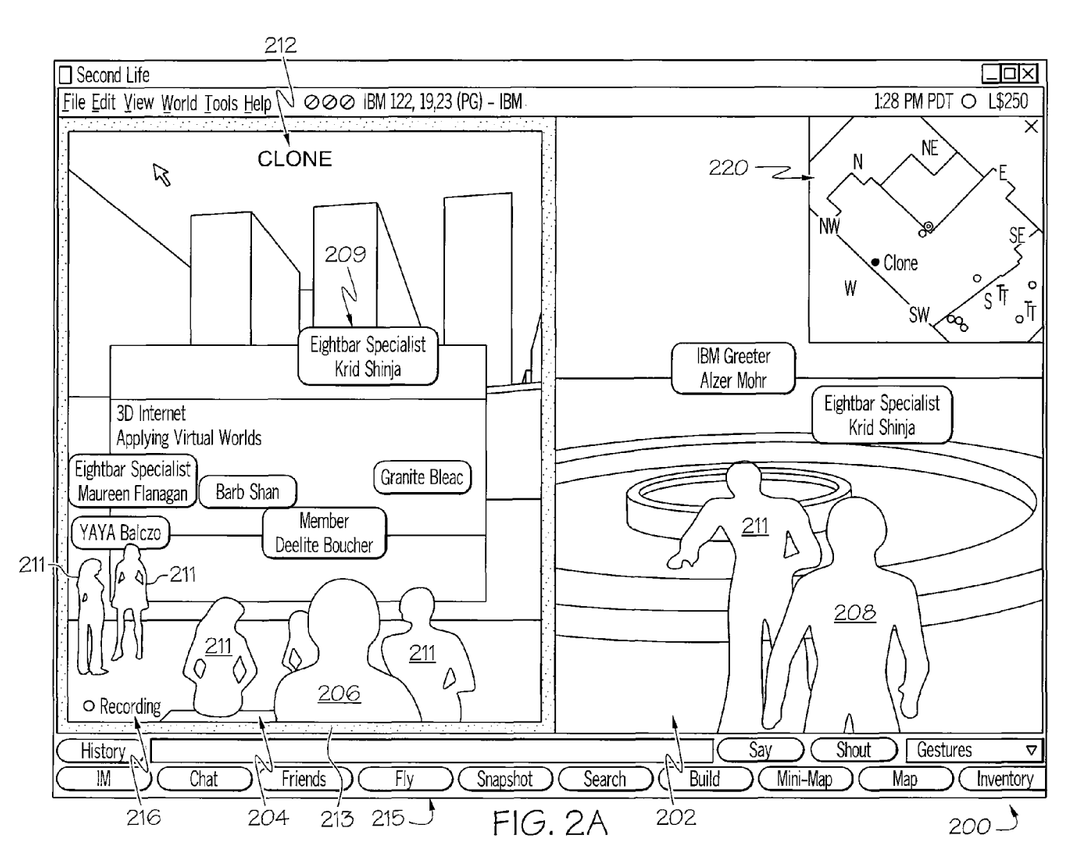
FIG. 2A is a screen shot of an example of a split screen view of a cloned avatar and the user's original or primary avatar, each in different portions of a virtual world in accordance with an embodiment of the present invention.

Referring also to FIG. 2A, FIG. 2A is a screen shot 200 of an example of a split screen view of a cloned avatar 206 and the user's original or primary avatar 208 in portions of a virtual world 202, 204 in accordance with an embodiment of the present invention. The screen shot 200 may be presented to the user on a display of a computer device as described herein. The split screen portion 204 illustrating the cloned avatar 206 is shown with the cloned avatar 206 attending a lecture. The cloned avatar 206 may have a label 209 to indicate the location and identity of the cloned avatar 206. Other avatars 211 within the virtual world may also be labeled.

The split screen portions 202 and 204 may be distinguished from one another to indicate which split screen portion includes the cloned avatar 206 and which split screen portion includes the user's original or primary avatar 208. For example, as illustrated in FIG. 2A the split screen portion 204 containing the cloned avatar 206 may be labeled "CLONE" 212. Alternatively or in addition, the split screen portion containing the cloned avatar 206 (or user's original or primary avatar) may be distinguished or highlighted, such as by a border 213 or by some other means. Additionally, any action or other activity being performed by the cloned avatar 206 may be presented or displayed. For example, as illustrated in FIG. 2A, if the cloned avatar is recording a lecture, a chat or other activity, "Recording" 216 or other symbol or functional name may be displayed in the cloned avatar split screen portion 204 as illustrated in FIG. 2A.

As shown in the illustrated embodiment in FIG. 2A, the split screens 202 and 204 may be of equal dimensions. However, the split screens 202 and 204 also may be of different sizes, in separate windows, in different locations on the screen or other configurations. The user may be allowed to resize the windows or split screen portions, such as minimizing, exiting, maximizing, or similar features using a computer pointing device or other means.

Figure 2B:
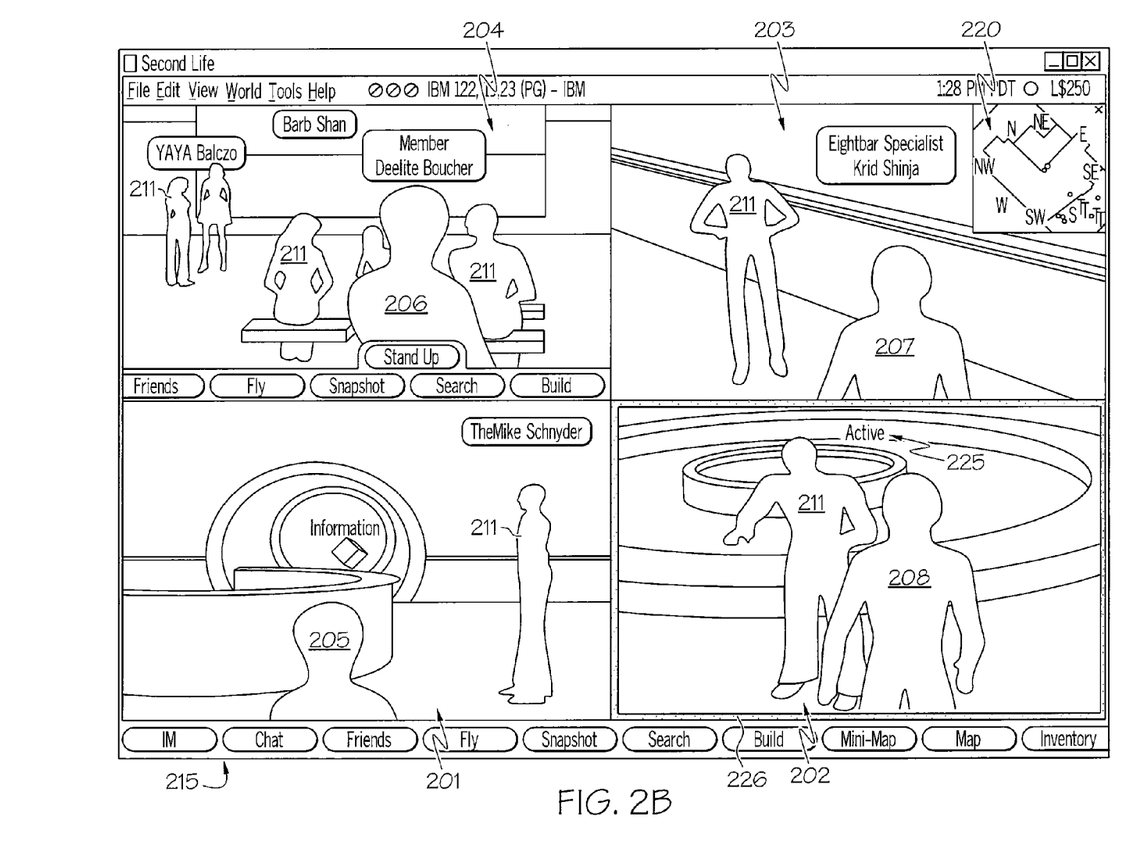
FIG. 2B is a screen shot of an example of a split screen view of multiple cloned avatars and the user's original or primary avatar in different portions of a virtual world in accordance with an embodiment of the present invention.

Referring also to FIG. 2B, FIG. 2B is a screen shot of an example of a split screen view of multiple cloned avatars 205, 206, 207 and the user's original or primary avatar 208 in different portions of a virtual world 201, 202, 203, 204 in accordance with another embodiment of the present invention. FIG. 2B illustrates that multiple cloned avatars 205, 206, 207 may be displayed simultaneously along with the user's original or primary avatar 208. The avatar that the user is actively controlling may be indicated or distinguished (shown in window 202). For example, the window or split screen portion containing the avatar (cloned or original avatar) that the user is actively controlling may be identified or distinguished, such as by labeling the active split screen with text (e.g. "Active" 225), highlighting the active split screen 226, emphasizing the window, such as surrounding the window with a distinguishing border or by any other arrangement to identify the active split screen portion or window and/or avatar.

As shown in FIGS. 2A and 2B, the split screen view may also include a legend, locator map 220 or similar representation to indicate the relative location of one or more cloned avatars and/or the user's original or primary avatar. This may be helpful, for example, in the case of where the user does not want the user's original avatar 208 to be within a proximate area or to come into contact with any of the cloned avatars 205, 206, 207. The locator map 220 may be located on the screen 200. The user may exit, minimize, resize, and/or maximize the locator map 220 at any time.

As illustrated in FIGS. 2A and 2B various tools 215 functional features may be provided for selection by the user. Some of the tools 215 may allow the user to perform actions within the virtual world, such as chatting with other avatars or giving other commands to the user's avatar. Other tools may allow the user to perform various actions on the computer, such as creating a snapshot of the virtual world, displaying a list of friends, instant messaging, displaying a map of the virtual world, and the like.

Referring back to FIG. 1, in block 116, the user may be notified in response to the occurrence of predetermined conditions associated with any cloned avatars that may require user interaction or control. The user may define one or more predetermined conditions that may require user interaction or control, such as another avatar approaching the cloned avatar, increased virtual world activity, a chat initiated with the clone by another avatar, the user's avatar approaching the clone, and the like. When any predetermined condition is fulfilled, the user may be notified. The notification may be by any visual or audible means, including displaying text, outputting an audible sound, causing the screen to blink, generating a pop-up icon, or similar alerting mechanism. The user may activate the notification feature, discussed in more detail herein with reference to FIG. 3, for a certain clone or cloned avatar while the window or split screen for the clone is not the active window or split screen. This allows the user to operate another clone or the user's avatar in an active window or split screen portion while still being able to be notified of a predetermined condition occurring in one of the non-active windows or split screen portions.

As previously mentioned with respect to block 112, the user may predefine functionalities of the clone, such as recording the clone's virtual world observations and/or interactions. In block 118, the clone may perform any of these predefined functionalities. Any of the recordings of the clone, such as presentation recordings, chat history recordings, and the like, may be archived for later use, distribution, replay and/or viewing by the user. The user may specify whether or not to archive the recordings. The archived recordings may be stored locally on the user's computer or computer storage medium, remotely on a server or at some location on a network.

Figure 3:
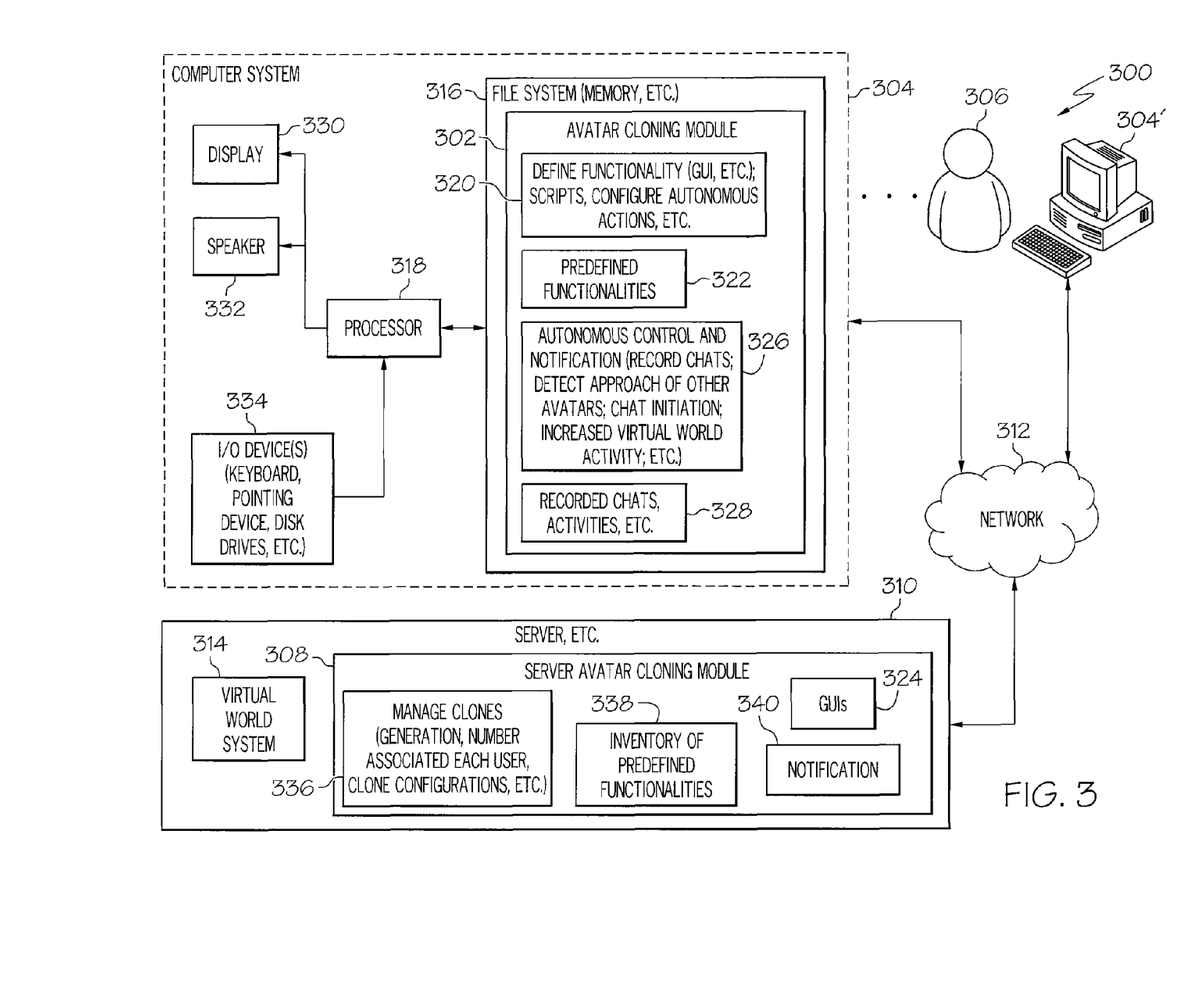
FIG. 3 is a block schematic diagram of an example of a system for avatar cloning in a virtual world in accordance with another embodiment of the present invention.

FIG. 3 is a block schematic diagram of an example of a system 300 for avatar cloning in a virtual world in accordance with another embodiment of the present invention. The system 300 may include an avatar cloning module 302 operable on a computer system 304, or similar device of a user 306 or client. Alternatively, or in addition to the avatar cloning module 302 on the user's computer system 304 or client, the system 300 may include a server avatar cloning module 308 operable on a server 310 and accessible by the user 306 or client 304 via a network 312. The method 100 may be embodied in or performed by the avatar cloning module 302 and/or the server avatar cloning module 310. For example, the method 100 may be performed by the avatar cloning module 302. In another embodiment of the invention, the method 100 may be performed by the server avatar cloning module 308. In a further embodiment of the present invention, some of the features or functions of the method 100 may be performed by the avatar cloning module 302 on the user's computer system and other features or functions of the method 100 may be performed on the server avatar cloning module 308.

A virtual world simulation system 314 may be operable on the server 310 and may be accessible by a plurality of users 306 or participants using an Internet browser on their respective computer systems 304 or clients. The virtual world simulation may be Second Life™ or a similar virtual world system. The avatar cloning modules 302 and 308 may be part of the virtual world simulation system 314 or may be separate applications or modules that interface with the virtual world simulation. The network 312 may be the Internet, a private network or other network. Each computer system 304' may be similar to the exemplary computer system 304 and associated components illustrated in FIG. 3.

The avatar cloning module 302 and/or 308 may be a self contained system with embedded logic, decision making, state based operations and other functions that may operate in conjunction with a virtual world simulation, such as Second Life™. The self contained system may allow businesses, individuals, services, locations, and the like in the virtual world to interact.

The avatar cloning module 302 may be stored on a file system 316 or memory of the computer system 314. The avatar cloning module 302 may be accessed from the file system 316 and run on a processor 318 associated with the computer system 314.

The avatar cloning module 302 may include a module for defining functionality and configuring autonomous actions 320 (hereinafter "configuration module"). The configuration module 320 allows the user to input various parameters into the computer system 304, such as clone functionality, autonomous control of the clone, notifications, computer display options, and the like. The configuration module 320 may be accessed or activated whenever the user desires to input information and may call other modules such as a predefined functionalities module 322 or GUIs 324 as described below. The configuration module 320 also allows input of scripts, programs, applications, autonomous actions and other defining parameters that may be associated by a cloned avatar.

The avatar cloning module 302 may also include predefined functionalities 322. A predefined functionality may include one or more actions predefined by the user that the clone may perform in response to at least one predefined stimulus occurring. After the user enters the predefined functionality, as described above with reference to the configuration module 320, the predefined functionality may be stored on the computer system 304. The predefined functionalities 322 may be activated or accessed at any time.

The avatar cloning module 302 may also include a module for autonomous control and notification 326. As previously discussed, the user may predefine actions for the clone to perform while in the virtual world, such as record chats, initiating chats with other avatars, recording lectures, perform certain gestures or movements or any other actions that may be desirable or allowable for the cloned avatar to autonomously perform. These tasks may be automatically performed without requiring any input from the user. The autonomous control and notification module 326 may control the clone in accordance with any predefined functionalities 322 or any other actions specified for the clone to perform.

The avatar cloning module 302 may also store any recordings 328, including recorded chats, recorded observations, recorded interactions, or other recorded activities. The recordings 328 may be stored on the computer system 304 and may be replayed, distributed, and/or viewed at any time.

The user computer system 304 may also include a display 330 and a speaker 332 or speaker system. The display may present the virtual world and the user's avatar and any cloned avatars as described herein and may permit control of the user's avatar and cloned avatars. Any GUIs 324 associated with the avatar cloning feature may also be presented on the display 330. The speaker 332 may present any voice or other auditory signals or information to the user 306.

The user computer system 304 may also include one or more input devices, output devices or combination input and output device, collectively I/O devices 334. The I/O devices 334 may include a keyboard, computer pointing device or similar means to control operation of avatars and the avatar cloning feature and to enter information into various GUIs as described herein. The I/O devices 334 may also include disk drives or devices for reading computer media including computer-readable or computer-operable instructions.

The server avatar cloning module 308 may present one or more predetermined GUIs 324, similar to the GUIs described with respect to the method 100 of FIG. 1, to permit the user's avatar to be cloned. The GUIs 324 may include a GUI to allow the user to enter functionality of the clones, enter scripts, configure autonomous actions and the like as previously discussed. These GUIs may be predetermined and presented in response to the user indicating the user would like to enter information and/or settings. The predetermined GUIs may be generated by the server avatar cloning module 308 and may be presented on the display 330 of the computer system 304. The GUIs 324 may also include GUIs to permit a virtual world system operator or owner to manage the avatar cloning feature, such as predefining cloned avatar functionalities, managing and monitoring the number of cloned avatars by each user or virtual world participant, as well as any other functions or features associated with avatar cloning.

The server avatar cloning module 308 may also include a module for managing clones 325. The module for managing clones 336 may perform various tasks with respect to creating and configuring each clone, including clone generation, determining the maximum number of clones for each user, clone configurations, and any other functions that may be appropriate for managing cloned avatars. As previously discussed with respect to block 106 of FIG. 1, to create a clone of the user's avatar, the current number of clones must be less than the maximum permitted number of clones. The module for managing clones 336 may determine if the current number of clones is less than the maximum permitted number of clones. If so, the module for managing clones 336 may generate a clone upon request of the user.

The server avatar cloning module 308 may also include an inventory of predefined functionalities 338. The inventory of predefined functionalities 338 may include any actions the clone may perform and/or any autonomous control of the clone and the like. As previously discussed, an inventory of predefined functionalities 322 may be stored locally on the user's computer 304 or the user's computer readable storage medium either in addition to the inventory of predefined functionalities 338 or in lieu of the inventory 338. The inventory 322 may also be stored remotely on the network 310 in a database (not shown). The server avatar cloning module 308 may determine if any predefined functionalities for a clone exists by checking the user's inventory of predefined functionalities 322. If so, the predefined functionalities may be accessed from the inventory of predefined functionalities 322.

The server avatar cloning module 308 may further include a notifications feature 340. The notifications feature 340 may include any notification that the virtual world may issue to the user, any notification as predefined by the user, any notification in response to user input being required by the user, any error notification, or other alert or notification, similar to that previously discussed with respect to block 116 of FIG. 1. The notification feature 340 may notify the user by any mechanism, including any audible means, visible means, or by any other means capable of being perceived by the senses of the user.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for avatar cloning in a virtual world, the system comprising:
   a processor implemented at least partially in hardware;
   a module operable on the processor, the module being configured to cause the processor to perform a set of functions comprising:
   receiving an input indicating a user desires to access a cloning feature to clone an avatar of the user;
   presenting a graphical user interface that comprises an option for the user to predefine actions for a cloned avatar of the avatar of the user to perform in the virtual world, the predefined actions for the cloned avatar of the avatar of the user to perform being different from and occurring simultaneously with the current activity of the avatar, wherein the predefined action for the cloned avatar of the avatar of the user to perform and the current activity of the avatar occur at separate locations in the virtual world;
   allowing the cloned avatar of the user to be cloned from the avatar of the user;
   presenting a split screen comprising at least two portions that are split from each other to permit the user to control either the avatar of the user on a first portion of the split screen or the clone of the avatar of the user on a second portion of the split screen; and
   identifying between the cloned avatar of the user in the second portion and the avatar of the user in the first portion which one is currently being actively controlled by the user, wherein the cloned avatar of the user and the avatar of the user are located in different portions of the virtual world;
   wherein the split screen comprises a first tool bar that is shared by the at least two portions and a second tool bar that is smaller than the first tool bar and positioned and used only in the second portion of the split screen, wherein the second tool bar comprises an indicator of the current actions of the cloned avatar and is configured to allow the user to directly control the actions of the cloned avatar.

2. The system of claim 1, wherein the set of functions further comprises presenting a graphical user interface to the user to allow the user to clone the avatar of the user.

3. The system of claim 1, wherein the set of functions further comprises recording any virtual world observations and interactions of the at least one cloned avatar in response to configuring the cloned avatar to record any virtual world observations and interactions for replay to the user.

4. The system of claim 3, wherein the predefined actions are automatically performable by the cloned avatar in response to a predetermined condition occurring.

5. The system of claim 3, wherein the set of functions further comprises notifying the user in response to occurrence of a predetermined condition associated with the cloned avatar to permit user interaction and control.

6. The system of claim 1, wherein the set of functions further comprises allowing the user to clone a plurality of cloned avatars from the avatar of the user.

7. The system of claim 6, wherein the set of functions further comprises allowing a preset maximum permitted number of cloned avatars of the user to be preset.

8. The system of claim 7, wherein the set of functions further comprises:
   notifying the user in response to receiving a request from the user to clone the avatar of the user and the number of previously cloned avatars of the user being at the preset maximum permitted number of cloned avatars of the user; and
   denying the request from the user to clone the avatar of the user in response to receiving the request from the user to clone the avatar of the user and the number of previously cloned avatars of the user being at the preset maximum number of cloned avatars.

9. The system of claim 1, wherein the set of functions further comprises automatically associating any predefined functionality with each cloned avatar.

10. The system of claim 1, wherein the set of functions further comprises distinguishing between the cloned avatar and the avatar of the user via a label.

11. A system for avatar cloning in a virtual world, the system comprising:
    a processor implemented at least partially in hardware;
    a module operable on the processor for, the module being configured to cause the processor to perform a set of functions comprising:
    receiving a request from a user to clone an avatar corresponding to the user;
    receiving input from the user predefining actions for the cloned avatar to perform in the virtual world, the predefined actions for the cloned avatar of the avatar of the user to perform being different from and occurring simultaneously with the current activity of the avatar, wherein the predefined action for the cloned avatar of the avatar of the user to perform and the current activity of the avatar occur at separate locations in the virtual world;
    cloning the avatar of the user to form at least one cloned avatar in response to receiving the request from the user to clone the avatar of the user; and
    presenting a split screen comprising at least two portions that are split from each other to permit the user to control either the avatar of the user on a first portion of the split screen or the clone of the avatar of the user on a second portion of the split screen; and
    identifying which one of the cloned avatar of the user and the avatar of the user is currently being actively controlled by the user, wherein the cloned avatar of the user and the avatar of the user are located in different portions of the virtual world;
    wherein the split screen comprises a first tool bar that is shared by the at least two portions and a second tool bar that is smaller than the first tool bar and positioned and used only in the second portion of the split screen, wherein the second tool bar comprises an indicator of the current actions of the cloned avatar and is configured to allow the user to directly control the actions of the cloned avatar.

12. The system of claim 11, wherein the set of functions further comprises:
    allowing the user to define at least one action performable by the at least one cloned avatar in response to at least one predetermined condition being fulfilled;
    notifying the user in response to the at least one predetermined condition being fulfilled; and
    executing the action in response to the at least one predetermined condition being fulfilled.

13. The system of claim 11, wherein the set of functions further comprises:
    allowing a maximum permitted number of cloned avatars of the user's avatar to be preset;
    denying the user's request to clone the user's avatar in response to a total number of previously cloned avatars of the user's avatar being at the preset maximum permitted number of cloned avatars; and notifying the user of the denial of the user's request in response to the total number of previously cloned avatars of the user's avatar being at the preset maximum permitted number of cloned avatars.

14. The system of claim 11, wherein the set of functions further comprises:

detecting a predetermined condition with any clones possibly requiring interaction by the user;

notifying the user in response to detecting predetermined condition; and allowing the user to control the cloned avatar associated with the detected predetermined condition.

15. The system of claim 11, wherein the set of functions further comprises recording any virtual world observations and interactions of the at least one cloned avatar in response to configuring the cloned avatar to record any virtual world observations and interactions for replay to the user.

16. The system of claim 11, wherein the set of functions further comprises distinguishing between the at least one cloned avatar and the user's avatar.

17. The system of claim 11, wherein the set of functions further comprises automatically associating any predefined functionality with each cloned avatar.

18. A computer program product for avatar cloning in a virtual world, the computer program product comprising:

a non-transitory computer readable storage medium having computer readable program code embodied therewith, the computer readable computer program code comprising:

computer readable program code configured to receive a request to clone an original avatar of a user;

computer readable program code configured to present a graphical user interface to allow the user to clone the original avatar of the user;

computer readable program code configured to allow control of the clone of the original avatar of the user, wherein the clone is controllable by at least one of:

computer readable program code configured to associate a predefined functionality with the clone for the clone to perform automatically while the user controls the original avatar, the predefined functionality for the clone to perform being different from and occurring simultaneously with the current activity of the original avatar, wherein the predefined functionality for the clone to perform and the current activity of the original avatar occur at separate locations in the virtual world;

computer readable program code configured to present a split screen comprising a first portion and a second portion that is split from the first portion to permit the user to control either the original avatar of the user on the first portion of the split screen or the clone of the original avatar of the user on the second portion of the split screen; and computer readable program code configured to identify on the split screen which avatar is currently being actively controlled by the user;

wherein the split screen comprises a first tool bar that is shared by the at least two portions and a second tool bar that is smaller than the first tool bar and positioned and used only in the second portion of the split screen, wherein the second tool bar comprises an indicator of the current actions of the cloned avatar and is configured to allow the user to directly control the actions of the cloned avatar.

19. The computer program product of claim 18, further comprising a locator map to represent a relative location of the avatar of the user and the cloned avatar of the user.

20. The computer program product of claim 18, further comprising computer readable program code configured to charge a subscription fee to the user based on a number of cloned avatars of the user.

* * * * *